United States Patent [19]

Fujioka et al.

[11] Patent Number: 4,813,004

[45] Date of Patent: Mar. 14, 1989

[54] METHOD FOR MEASURING THE MAXIMUM GROSS WEIGHT OF A MOTOR VEHICLE

[75] Inventors: Arisa Fujioka, Kawaguchi; Satoshi Kageyama, Yokohama, both of Japan

[73] Assignee: Kabushiki Kaisha Toshiba, Kawasaki, Japan

[21] Appl. No.: 42,242

[22] Filed: Apr. 24, 1987

[30] Foreign Application Priority Data

Apr. 28, 1986 [JP]   Japan .................................. 61-98701

[51] Int. Cl.⁴ ........................ G08B 21/00; G06K 9/00
[52] U.S. Cl. .................................... 364/567; 340/666;
     340/937; 356/376; 364/516; 364/550; 364/560;
     382/1
[58] Field of Search ............... 364/464, 514, 516, 550,
     364/560, 567, 568; 340/666, 928, 933, 937;
     382/1, 10, 22, 36; 356/376

[56] References Cited

U.S. PATENT DOCUMENTS

| | | | |
|---|---|---|---|
| 3,794,966 | 2/1974 | Platzman | 340/928 |
| 3,835,449 | 9/1974 | Viracola | 340/933 |
| 4,167,729 | 9/1979 | Christenson et al. | 364/516 |
| 4,396,903 | 8/1983 | Habicht et al. | 382/22 |
| 4,493,103 | 1/1985 | Yamashita et al. | 382/1 |
| 4,539,650 | 9/1985 | Griffin et al. | 364/567 |
| 4,605,081 | 8/1986 | Helmy, Jr. et al. | 364/567 |

*Primary Examiner*—Parshotam S. Lall
*Assistant Examiner*—Kevin J. Teska
*Attorney, Agent, or Firm*—Oblon, Fisher, Spivak, McClelland & Maier

[57] ABSTRACT

A correlogram is initially prepared which represents a relation between the gross volume of all tries and the maximum gross weight of a motor vehicle. The maximum gross weight of the vehicle is one of important factors for determining a charge for a vehicle to be run on the toll road. In the method of this invention the outer diameter and rim diameter of the respective wheels of the vehicle are found through the processing of the side profile image of the vehicle as obtained by a TV camera. According to this invention the total volume of all the tires is calculated from the outer diameter, rim diameter, width and total number of the wheels. In this way, the maximum gross weight of the vehicle is calculated based on the correlogram.

11 Claims, 4 Drawing Sheets

METHOD FOR MEASURING THE MAXIMUM GROSS WEIGHT OF A MOTOR VEHICLE

BACKGROUND OF THE INVENTION

This invention relates to a method for measuring the maximum gross weight of a motor vehicle, by use of an image-processing step, in order to determine the charge for a motor vehicle using a toll road, such as a toll express highway.

Since a broad variety of motor vehicles use toll roads, motor vehicle type must therefore be taken into consideration when determining an appropriate charge for the vehicle using the toll road. In other words, the charge for the motor vehicle in question should be determined primarily in accordance with its size and especially its gross weight. Using vehicle gross weight as a factor in determining an appropriate charge is considered reasonable, in view of the possible damage the vehicle may cause to the road. Here, the term "gross weight of the vehicle" is intended to mean the weight of the vehicle per se, plus the load carried by the vehicle, and including the occupants.

Therefore, various devices have been developed for measuring the gross weight of a motor vehicle, such as those described in Japanese Patent Disclosure (KOKAI) Nos. 53-41248, 53-41249, and 61-50013. These known devices use a load sensor to measure the gross weight of the vehicle. Various such sensors are known, as are shown in these Japanese Patent Disclosures. All these sensors, however, suffer from poor durability, since they have to bear the actual weight of the vehicle, in order to measure its gross weight. Where, therefore, the actual gross weight of the vehicle is to be measured directly, it is necessary to initially perform the time-consuming checking and maintenance of the load sensor. To neglect to do so will likely result in inaccurate measurement of the gross weight of the vehicle. Furthermore, even if the gross weight of the vehicle is to be measured using the known measuring device, i.e. while the vehicle is in motion, the weight value indicated by the load sensor will vary, depending upon the speed at which the vehicle is moving. When, therefore, the gross weight of the vehicle is to be precisely measured, it must be carried out with the vehicle stopped. This inevitably makes the weighing of each individual vehicle a time-consuming process.

As must be clearly evident from the above explanation, this method of measuring the gross weight of the vehicle, to determine its road toll charge, is not a realistic approach. It is common practice, therefore, to determine the road toll charge on the basis of the maximum gross weight of the vehicle rather than to determine its actual gross weight. Here, the term "maximum gross weight" is intended to mean the weight of the vehicle per se, plus the maximum allowable load, and including the occupants. In other words, it is usual practice for the road toll charge to be determined in accordance with the maximum allowable gross weight, regardless of the actual load (including the occupants) being carried by the vehicle, as opposed to determining the actual gross weight of the vehicle.

It is therefore desirable that, in order to determine the charge for a vehicle using a toll road, the aforementioned maximum gross weight can be measured without the need to measure the actual gross weight of the vehicle.

SUMMARY OF THE INVENTION

It is accordingly the object of this invention to provide a method, which uses an image-processing step, whereby the maximum gross weight of a vehicle can be rapidly measured, even if the vehicle is in motion.

The aforementioned object of this invention is attained by a method for measuring the maximum gross weight of a vehicle, which comprises the steps of:

preparing a correlogram for evaluating the maximum gross weight on the basis of a volume corresponding to the dimensions of all the wheels of the vehicle;

measuring the number, width, and diameter of the wheels, the measuring step including an input process for obtaining image data corresponding at least to the side profiles of the wheels, and a calculation process for calculating the diameter of the respective wheels, on the basis of the image data;

calculating the volume, on the basis of the data relating to the number, width, and diameter of the wheels of the vehicle, as obtained in the measuring step; and determining, from the correlogram prepared in the preparation step, the maximum gross weight of the vehicle, on the basis of the volume, as determined in the calculating step.

It has been ascertained that the volume correlates to the maximum gross weight of the vehicle. In the method of this invention, the maximum gross weight of the vehicle can be determined by the volume of the wheels, on the basis of the correlogram showing this correlation. According to this invention, it is not necessary to measure the actual gross weight of the vehicle to determine its road toll.

According to this invention, an image processing step is used to measure the diameter of each wheel of the vehicle, enabling the diameter of the wheel to be accurately measured even if the vehicle is moving. Furthermore, since pressure-sensitive sheets, etc. are used in the measuring of the number and width of the vehicle's wheels, the number and width of the wheels can be readily measured, the vehicle pass over these sheets. Thus, there is no need to stop the vehicle nor is there any damage caused to the measuring apparatus by the vehicle driving over it. According to this method, even when the vehicle is in motion, it is still possible to measure the respective data items used to evaluate the maximum gross weight of the vehicle and thus to rapidly ascertain its maximum gross weight on the basis of the data items measured. At a toll gate, the toll that the driver of the vehicle must pay can be quickly calculated from the maximum gross weight of the vehicle. Therefore, the driver need not wait for a long time, and can drive his vehicle away from the toll gate upon paying the toll.

DETAILED DESCRIPTION OF THE PREFERRED EMBODIMENTS

Figure 1:
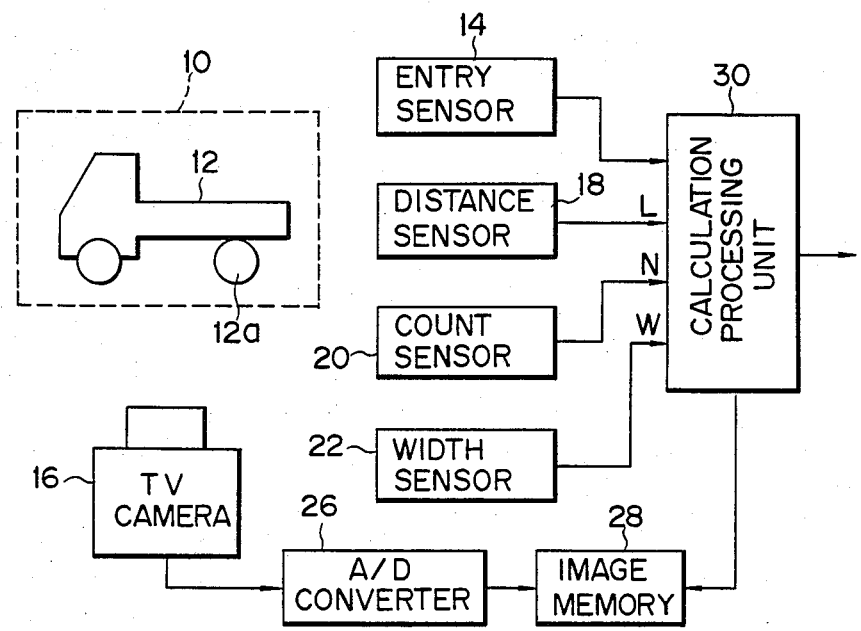
FIG. 1 is a schematic view showing a measuring system for performing the method of this invention.

In FIG. 1, area 10 as indicated by a broken line shows a measuring area for a motor vehicle. The measuring area is situated in front of an entry gate, i.e., a toll gate, not shown, for the toll road. In area 10 are properly located entry sensor 14 for detecting the entry of motor vehicle, TV camera (telecamera) 16 for inputting a side image of vehicle 12, distance sensor 18 for measuring the distance between TV camera 16 and vehicle 12, count sensor 20 for detecting the number of wheels 12a of the vehicle and width sensor 22 for measuring the width of respective wheels 12a of vehicle 12.

Stated in more detail, entry sensor 14 is comprised of a photoelectric switch operated by the entry of vehicle 12 into measuring area 10. Alternatively, entry sensor 14 may be comprised of a pressure sensor which is located on measuring area 10 at run surface 1a for vehicle 12 and actuated upon being applied by the weight of vehicle 12.

Figure 2:
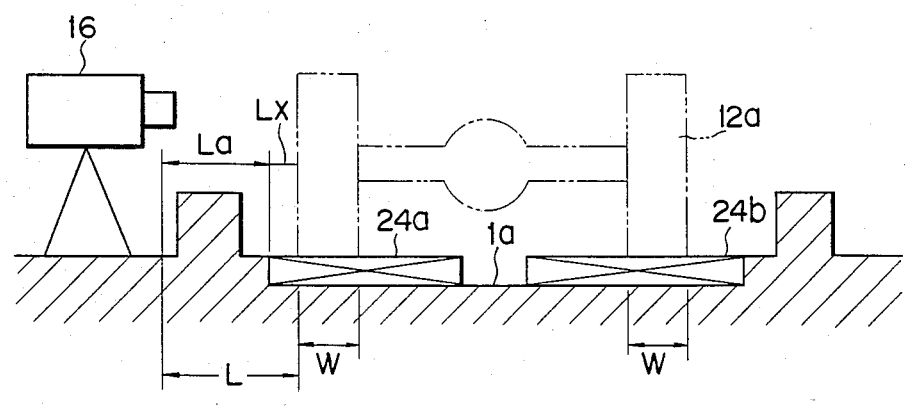
FIG. 2 is a front view showing the wheels of a motor vehicle and associated pressure-sensitive sheets for measuring of the width of each wheel and the number of the wheels of the vehicle.

Distance sensor 18 is comprised of, for example, a laser range finder and can measure the distance L between TV camera 16 and vehicle 12 as shown in FIG. 2.

Figure 3:
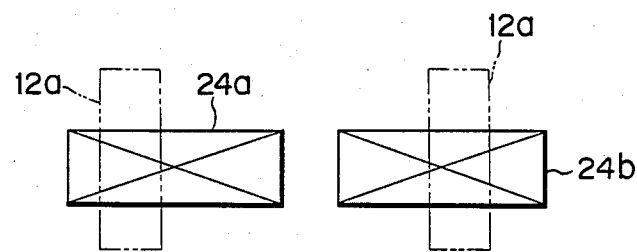
FIG. 3 is a plan view showing an arrangement similar to that of FIG. 2.

Count sensor 20 and width sensor 22 as shown in FIGS. 2 and 3 are comprised of a pair of pressure-sensitive sheets 24 laid on run surface 1a of measuring area 10. Pressure-sensitive sheets 24 are of such a type that vehicle 12 passes through measuring area 10 with left and right wheels 12a run on corresponding pressure-sensitive sheets 24. Pressure-sensitive sheet 24 is comprised of a longer rubber sheet extending in a direction perpendicular to that in which the vehicle is run, and a greater number of piezoelectric elements sequentially arranged in the longitudinal direction within the rubber sheet. In this way, when the vehicle runs over pressure-sensitive sheets 21, the load of the vehicle is applied on pressure-sensitive sheets 24 through wheels 12a and thus the pressure-sensitive sheet produces a pressure signal each time the wheels of vehicle 12 run on the pressure-sensitive sheets. Therefore, the total number of wheels 12a of the vehicle can be found by measuring the number of pressure signals output from pressure sensors 24 as will be set forth below.

As is apparent from FIG. 2 and FIG. 3, pressure-sensitive sheets 24a and 24b are placed such that they are perpendicular to the running direction of a motor vehicle. A large number of piezoelectric elements are embedded in pressure-sensitive sheets 24a and 24b. The piezoelectric elements are arranged in the longitudinal direction of sheets 24a and 24b. When the vehicle is moved across sheets 24a and 24b those piezoelectric elements which are pressed by the vehicle produce output signals. Therefore, the width of each wheel of the vehicle can be detected on the basis of the number of piezoelectric elements which produce the output signal. This being so, the number of piezoelectric elements which produce the output signal is proportionate to the width of each wheel.

As a result, pressure-sensitive sheets 24a and 24b can generate signals corresponding to the width W of wheels 12a. The pressure-sensitive sheets can generate signals from a corresponding number of piezoelectric elements to which the load of the vehicle is applied as the vehicle runs over the sheets.

Furthermore, the pressure-sensitive sheets, if used as set forth above, can also be used as distance sensor 14. That is, when the wheels' of the vehicle run on pressure-sensitive sheets 24, the sheet generates signals corresponding to the width of the wheel as set out above, in which case the length Lx from the end of pressure-sensitive sheet 24 to the wheel can also be found as evident from FIG. 2. Let it be assumed that the length La from TV camera 16 to the end of pressure-sensitive sheet 24 is initially found. In this case the distance L from TV camera 16 to the wheel can be measured by adding together the lengths La and Lx.

As set out above, TV camera 16 has the function of inputting an image corresponding to the side profile of vehicle 12 entering into measuring area 10. The image data is supplied from TV camera 16 through A/D (analog/digital converter) 26 to image memory 28 where it is stored. The data storage into image memory 28 is implemented immediately after the detection of the entry of vehicle 12.

The various data items of sensors 14, 18 and 24 and image memory 28 are supplied to processing unit 30 shown in FIG. 1.

Figure 4:
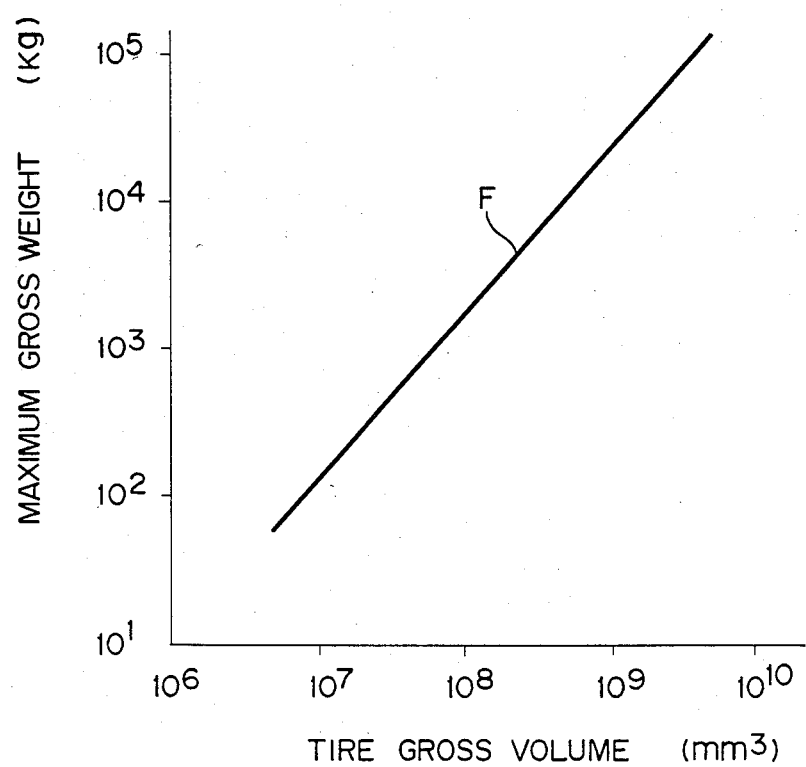
FIG. 4 is a correlogram showing a relation of the total volume of all the wheels of the vehicle to the maximum gross weight of the vehicle.

Processing unit 30 includes an internal memory, not shown, where data items corresponding to the correlogram F in FIG. 4, on a log-log scale, are stored, noting that the correlogram F was initially obtained by actually measuring the relation of the total volume of all tires of a vehicle to the maximum gross weight for that vehicle. From the correlogram F of FIG. 4, it will be seen that the greater the total volume of all the tires of the wheels of the vehicle the greater the maximum gross weight of the vehicle. Furthermore, processing unit 30 includes an additional internal memory, not shown, where a background image, not including the image of vehicle 12, which is input from the TV camera is initially stored.

The method of this invention will be explained below with reference to the flowchart of FIG. 5.

At step 100, entry sensor 14 detects whether or not vehicle 12 enters measuring area 10. If the answer is in the affirmative, TV camera 16 receives image data, at step 102, corresponding to the side profile of vehicle 12 so that it may be stored in image memory 28. Concurrently with the implementation of step 102, distance sensor 18 measures the distance L from TV camera 16 to vehicle 12 while, at the same time, pressure-sensitive sheet 24 measures a total number of wheels, N, of vehicle 12 at step 106. Furthermore, at step 108, the pressure-sensitive sheet measures the width W of respective wheel 12a of the vehicle as in the case of step 106. The measured dimensions L, N and W are transmitted to processing unit 30.

Figure 6:
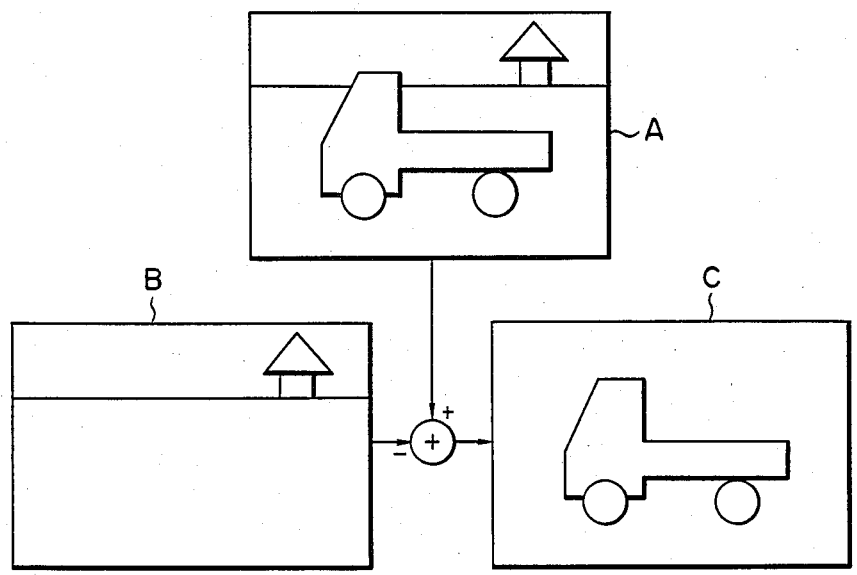
FIG. 6 is a view showing how part of image data is processed.

Thereafter, processing unit 30 extracts only the "side image" data of vehicle 12 from the image data which has been obtained at step 110. That is, it will be appreciated from FIG. 6 that the image data A obtained at step 102 contains not only the side picture of vehicle 12 but also the background of vehicle 12, as the image data. Since, however, the background image data B is initially stored in the internal memory of processing unit 30 as set out above, only the "side image" data C can be extracted by eliminating the background image data B from the image data A.

At step 112, an edge line image is extracted from the "side image" data C and, in this case, this is done by determining a portion of a predetermined fine image area having an intensity level exceeding a predetermined level, as an edge line, while consideration is given to the varying shade of an intensity distribution for the "side image" data C. At step 114, the data of the wheel components corresponding to wheel 12a of vehicle 12 is extracted form the edge line image which has been obtained at step 112. The extraction of the data for the wheel components can be made by extracting all the circular components comprised of a closed loop from the edge line image obtained at step 112 and determining those circular components whose circularity e is substantially equal to $4\pi$ as being circular components corresponding to wheels 12a.

Here the circularity e is evaluated from the following equation:

$$e = M^2/S$$

where
M: the length of the circumference of the circular components
S: the area of the circular component At step 116, the outer diameter D1 and rim diameter D2 of wheel 12a are respectively evaluated from the circular components which have been determined as corresponding to wheel 12a. Here, since wheel 12a is comprised of a wheel disc and tire, the circular components thus determined assume a double-circle configuration. Thus the outer diameter D1 of wheel 12a, i.e., the diameter of the tire, can be calculated from the outer diameter of the circular component and the rim diameter D2 of the wheel disc of wheel 12a can be calculated from the inner diameter of the circular component.

At step 118, the outer diameter D1 and rim diameter D2 of wheel 12a as evaluated at step 116 are corrected based on the value of the distance L as measured at step 104. That is, the size of the side image of vehicle 12 which is input through TV camera 16 varies, depending upon the distance L between TV camera 16 and vehicle 12, because the angle of visibility at which a shot is taken by TV camera 16 is limited. As a result, the values of the outer diameter D1 and rim diameter D2 of vehicle 12 as obtained at step 116 can exactly be calculated by correcting these diameters on the basis of the value of the distance L. It is to be noted that these diameters can more exactly be evaluated with the use of correction based on the aforementioned angle.

Figure 7:
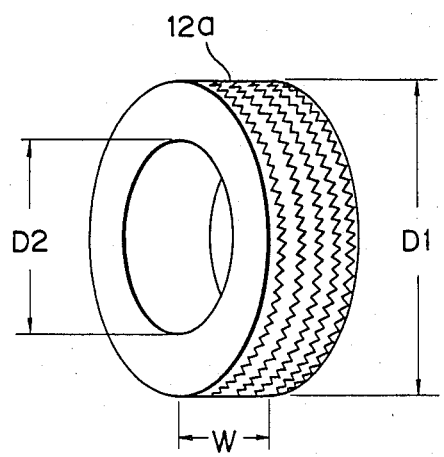
FIG. 7 is a perspective view showing the wheel of the vehicle.

At step 120, the volume V of the tire of wheel 12a can be evaluated from the distance D1 and D2 obtained at 118 and width W of wheel 12a obtained at 108. From FIG. 7, it will be seen that the volume V of the tire can be evaluated by the following equation:

$$V = \{(D1/2)^2 - (D2/2)^2\} \cdot W \cdot \pi$$

At step 122, the total volume Vsum of all the tires can be calculated by adding together the volumes V of the tires of respective wheels 12a as found at step 120.

At step 116, it is possible to measure the diameters D1 and D2 of wheels 12a on one side, i.e., the front and rear wheels on one side of the vehicle. Viewed individually, the left and right front wheels are not different in their diameters from each other and the same thing can equally apply to the left and right rear wheels. Thus, at step 122, the total volume Vsum of all the tires can be evaluated by finding the total volume of the tires of the front and rear wheels only on one side of vehicle 12 and doubling the value thus found.

In view of the above it is not always required that the pair of pressure-sensitive sheets be provided in the measurement of the width W and total number of wheels, N, of the vehicle. This invention can adequately be reduced to practice even if use is made of single pressure-sensitive sheet 24.

Even in this invention, the double type rear wheels of, for example, a vehicle may obviously be counted in terms of single rear wheel.

Since this invention is applied to a motor vehicle, such as a passenger car, whose wheels are equal to each other, the total volume Vsum of all the tires of the vehicle can be evaluated by finding the volume V of the tire of only one wheel and multiplying the value of the volume V by the total number of the wheels.

Then at step 124 the maximum gross weight corresponding to the total volume Vsum can be evaluated from the aforementioned correlogram F and total volume Vsum of all the tires as obtained at step 122.

The invention is not restricted to the aforementioned embodiment. Although, in the aforementioned embodiment, the total number N and width W of respective wheels 12a are measured using pressure-sensitive sheet 24, another TV camera for receiving the front image of vehicle 12 may be provided to allow the processing of the front image obtained therefrom. In this case, the width W of respective wheels 12a can be evaluated through that image processing, and the total number of the wheels of the vehicle can be also evaluated from the image data obtained form both the TV cameras.

It is not always necessary that TV camera 16 allow the inputting of all the "side image" data of vehicle 12. It is only necessary that TV camera 16 allow the inputting of the image data corresponding to the wheel per se of vehicle 12.

Figure 5:
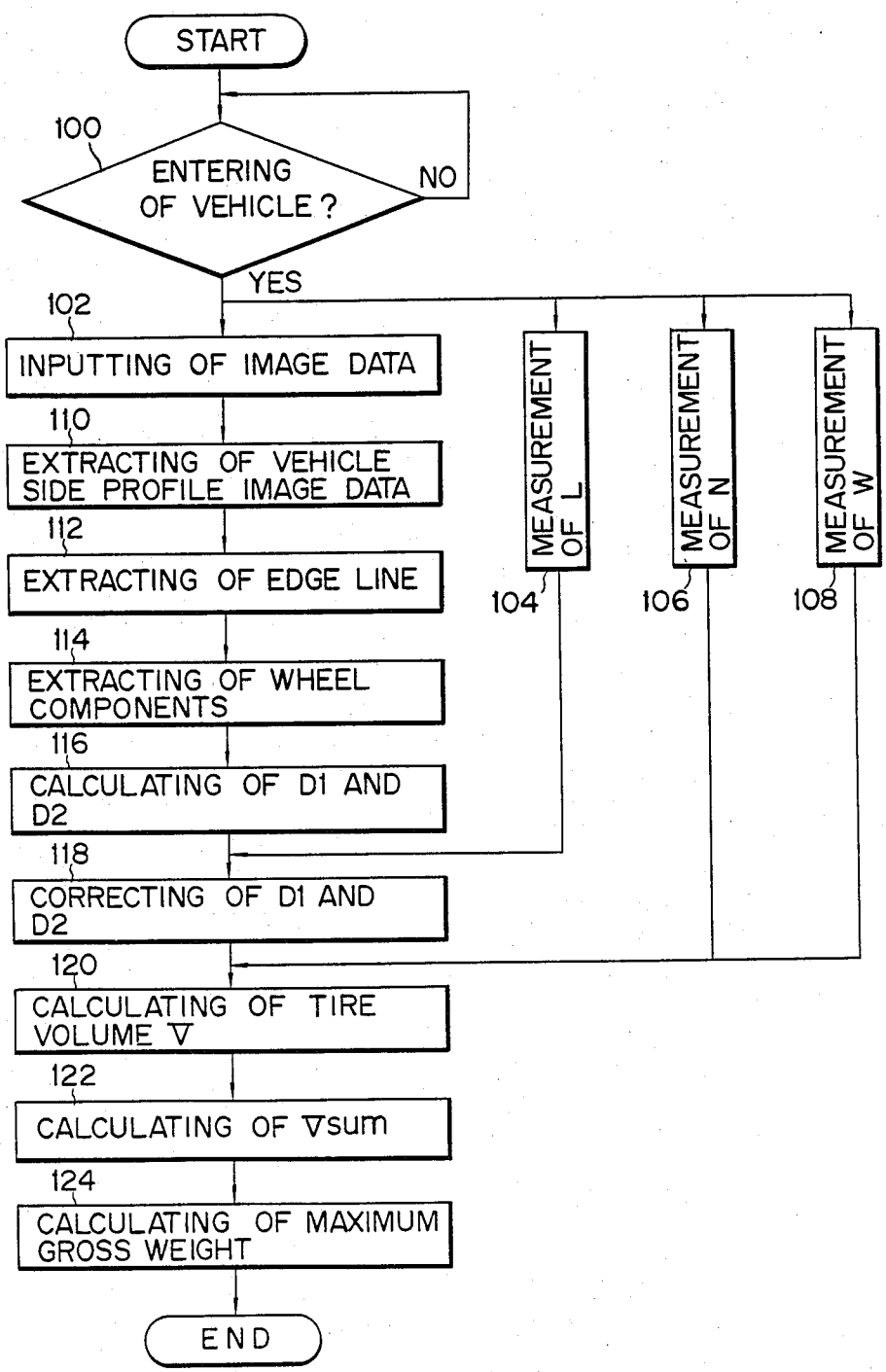
FIG. 5 is a flowchart showing the steps by which the method of this invention is performed.

In the aforementioned embodiment, although the total volume Vsum of all the tires of vehicle 12 has been explained as being evaluated based on the correlogram F of FIG. 5 representing a relation of the maximum gross weight of the vehicle to the total volume of all the tires of vehicle 12, the volume of the respective wheel can be found from the outer diameter D1 and width W of the wheel, provided that the correlogram represents a relation of the maximum gross weight of the vehicle to the gross volume of all the wheels of he vehicle.

If, with respect to the image processing of this invention, part of the wheel is hidden, for example, by the body of the vehicle, the whole wheel is recognized as a wheel corresponding to an edge line describing a predetermined circle in which case the outer diameter D1 and rim diameter D2 of the wheel can be calculated from the curvature of the arcuate components.

What is claimed is:

1. A method for measuring a maximum gross weight of a motor vehicle having a plurality of wheels, comprising the steps of:
    preparing a correlogram for finding a maximum gross weight of said motor vehicle on the basis of a volume corresponding to said plurality of wheels' wheel dimensions;
    measuring a number corresponding to a quantity of said plurality of wheels, and measuring a width W and a diameter D1 for each wheel of said plurality of wheels, said measuring step including an input process for obtaining image data comprised of at least a side profile of said plurality of wheels and said measuring step including an image calculation process for calculating the diameter D1 of each wheel of said plurality of wheels on the basis of said image data;

calculating said volume corresponding to said plurality of wheels' wheel dimensions, said volume being calculated according to a predetermined formula which takes into account the quantity of said plurality of wheels and the width W and diameter D1 of each wheel of said plurality of wheels as obtained in the measuring step; and determining, from the correlogram prepared in the preparation step, the maximum gross weight of the motor vehicle on the basis of the volume as determined in the calculating step.

2. The process according to claim 1, wherein:
said input process of said measuring step is performed with the use of a TV camera.

3. The method according to claim 2, wherein:
said input process of said measuring step includes a process for eliminating image data, corresponding to a background for the side profile of said plurality of wheels, from the image data which is obtained by said TV camera.

4. The method according to claim 3, wherein:
said image calculation process of said measuring step includes a process for extracting wheel components, corresponding to a wheel of the vehicle, from the image data of the side profile of said plurality of wheels.

5. The process according to claim 1, wherein:
during said measuring step a diameter D2 is measured and calculated on the basis of said image data, and during said calculating step the volume is calculated according to the predetermined formula which takes the diameter D2 into account.

6. The process according to claim 5, wherein:
the volume calculated in the calculating step represents a volume of all tires supporting said motor vehicle.

7. An apparatus for measuring a maximum gross weight of a motor vehicle, comprising:
recording means for recording and storing a correlogram, by use of which the maximum gross weight of the vehicle is calculated on the basis of a volume corresponding to dimensions of all wheel of the vehicle;

measuring means for measuring a number of wheels and a width W and a diameter D1 of each of the wheels, said measuring means including input means for input of image data representing a side profile of the vehicle;

image-processing means for obtaining at least the diameter D1 of each of the wheels on the basis of the image data input by the input means;

calculating means for calculating the volume corresponding to the dimensions of all the wheels, the volume being calculated according to a predetermined formula which takes into account the number of wheels, and the width W and diameter D1 of each of the wheels which are measured by the measuring means; and means for determining the maximum gross weight of the vehicle which corresponds to the volume calculated by said calculating means, by using the correlogram stored by said recording means.

8. An apparatus according to claim 7, wherein;
said measuring means measures a diameter D2 and said calculating means utilizes the diameter D2 in calculating the volume according to the predetermined formula.

9. An apparatus according to claim 7, wherein:
said measuring means includes a measurement region into which the vehicle can be advanced, a count sensor for counting the number of the wheels of the vehicle, a width sensor for detecting the width of the wheels, and a TV camera serving as said input means, said count sensor, said width sensor and said TV camera being arranged in the measurement region.

10. An apparatus according to claim 9, wherein:
said measuring means includes an entry sensor for detecting the vehicle entering the measurement region.

11. An apparatus according to claim 9, wherein:
said image-processing means includes a distance sensor for measuring a distance between the TV camera and the vehicle which has entered the measurement region.

* * * * *